(12) United States Patent
Höellriegl

(10) Patent No.: US 11,045,994 B2
(45) Date of Patent: Jun. 29, 2021

(54) APPARATUS AND METHOD FOR FORMING PLASTIC PREFORMS INTO PLASTIC CONTAINERS WITH COUPLING DEVICE

(71) Applicant: KRONES AG, Neutraubling (DE)

(72) Inventor: Thomas Höellriegl, Teublitz (DE)

(73) Assignee: KRONES AG, Neutraubling (DE)

( * ) Notice: Subject to any disclaimer, the term of this patent is extended or adjusted under 35 U.S.C. 154(b) by 323 days.

(21) Appl. No.: 15/766,047

(22) PCT Filed: Sep. 13, 2016

(86) PCT No.: PCT/EP2016/071582
§ 371 (c)(1),
(2) Date: Apr. 5, 2018

(87) PCT Pub. No.: WO2017/060047
PCT Pub. Date: Apr. 13, 2017

(65) Prior Publication Data
US 2019/0111608 A1    Apr. 18, 2019

(30) Foreign Application Priority Data
Oct. 6, 2015   (DE) .................. 10 2015 117 017.5

(51) Int. Cl.
*B29C 49/56* (2006.01)
*B29C 49/48* (2006.01)
(Continued)

(52) U.S. Cl.
CPC .............. *B29C 49/56* (2013.01); *B29C 49/48* (2013.01); *B29C 49/06* (2013.01); *B29C 49/12* (2013.01);
(Continued)

(58) Field of Classification Search
CPC ....................... B29C 2049/4892; B29C 49/56
See application file for complete search history.

(56) References Cited

U.S. PATENT DOCUMENTS

| 4,313,720 A | * | 2/1982 | Spurr | B29C 49/4205 264/535 |
| 4,850,850 A | * | 7/1989 | Takakusaki | B29C 49/4205 425/526 |

(Continued)

FOREIGN PATENT DOCUMENTS

| CN | 103171130 A | 6/2013 |
| CN | 104441576 A | 3/2015 |

(Continued)

OTHER PUBLICATIONS

Partial machine translation of Chinese reference CN 103171130 A dated Jun. 2013 obtained from the espace website. (Year: 2013).*
(Continued)

*Primary Examiner* — Robert B Davis
(74) *Attorney, Agent, or Firm* — Schmeiser, Olsen & Watts, LLP

(57) ABSTRACT

Provided is an apparatus for deforming plastics parisons to form plastics containers, having a blow-molding device which is arranged at least indirectly on a main shaft which is pivotable about a pivot axis, which blow molding device has at least two mold supports, a base element and two blow mold parts, wherein the base element and the blow mold parts are suitable for forming a cavity within which the plastics parisons are deformable to form the plastic containers, and the base element is arranged on a base receptacle, and having a coupling device which couples an opening movement of the blow mold parts to a raising and lowering movement of the base part relative to the blow mold parts.

15 Claims, 9 Drawing Sheets

Figure 1B:
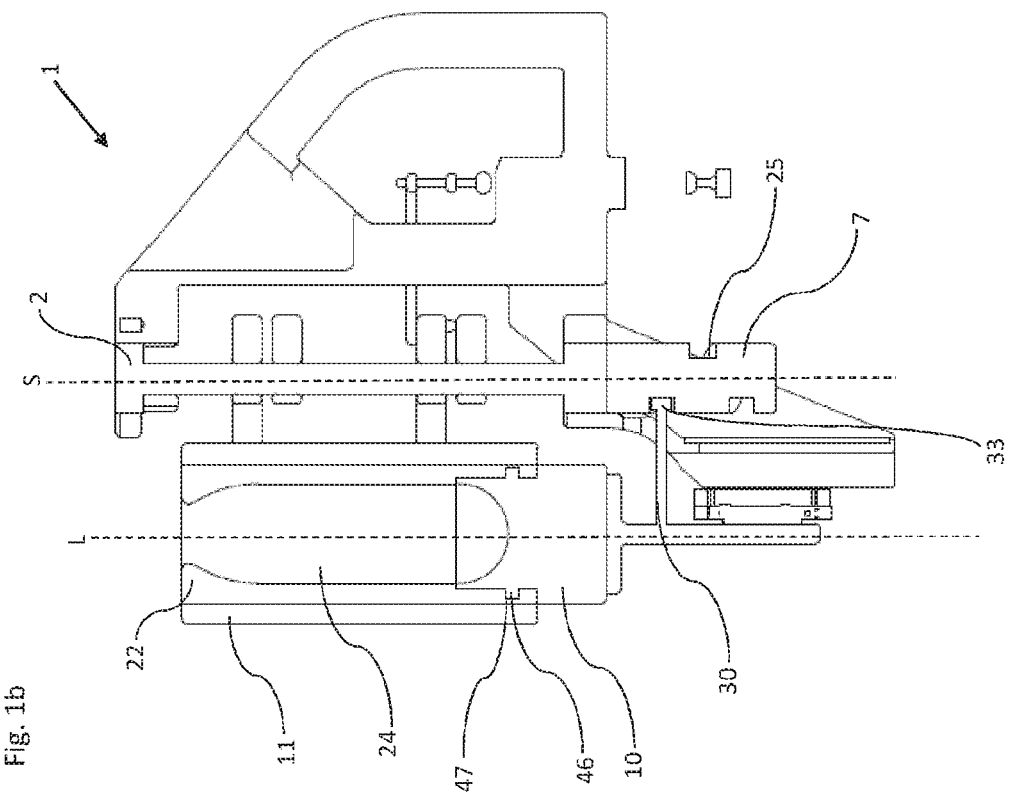

(51) Int. Cl.
   *B29L 31/00* (2006.01)
   *B29C 49/06* (2006.01)
   *B29C 49/12* (2006.01)
(52) U.S. Cl.
   CPC ............... *B29C 2049/4892* (2013.01); *B29L 2031/7158* (2013.01)

(56) References Cited

U.S. PATENT DOCUMENTS

| | | | |
|---|---|---|---|
| 6,994,542 B2* | 2/2006 | Tsau | B29C 49/56 425/405.1 |
| 8,622,728 B2* | 1/2014 | Spitzer | B29C 49/42 425/214 |
| 8,770,957 B2* | 7/2014 | Laumer | B29C 49/46 425/73 |
| 2006/0093699 A1 | 5/2006 | Arakelyan | |
| 2007/0292550 A1 | 12/2007 | Klatt et al. | |
| 2008/0063742 A1* | 3/2008 | Legallais | B29C 49/56 425/451.4 |
| 2010/0203185 A1 | 8/2010 | Litzenberg | |
| 2011/0117237 A1* | 5/2011 | Penninger | B29C 33/26 425/540 |
| 2013/0040009 A1* | 2/2013 | Laumer | B29C 49/46 425/182 |
| 2013/0115326 A1 | 5/2013 | Zacche' | |
| 2015/0079212 A1* | 3/2015 | Handschuh | B29C 49/36 425/88 |

FOREIGN PATENT DOCUMENTS

| | | |
|---|---|---|
| CN | 103171140 B | 7/2015 |
| DE | 60308207 T2 | 8/2007 |
| DE | 202013009941 U1 | 11/2013 |
| DE | 102013015093 A1 | 3/2015 |
| WO | 2008138293 A1 | 11/2008 |
| WO | WO-2016051373 A1 * | 4/2016 ............ B29C 49/48 |

OTHER PUBLICATIONS

International Search Report PCT/EP2016/071582, International Filing Date: Sep. 13, 2016.
Chinese Office Action dated Sep. 20, 2019 for Application No. 2016800568375.
Non-English Chinese Office Action for Application No. 201680056837.5, dated Apr. 26, 2020.

* cited by examiner

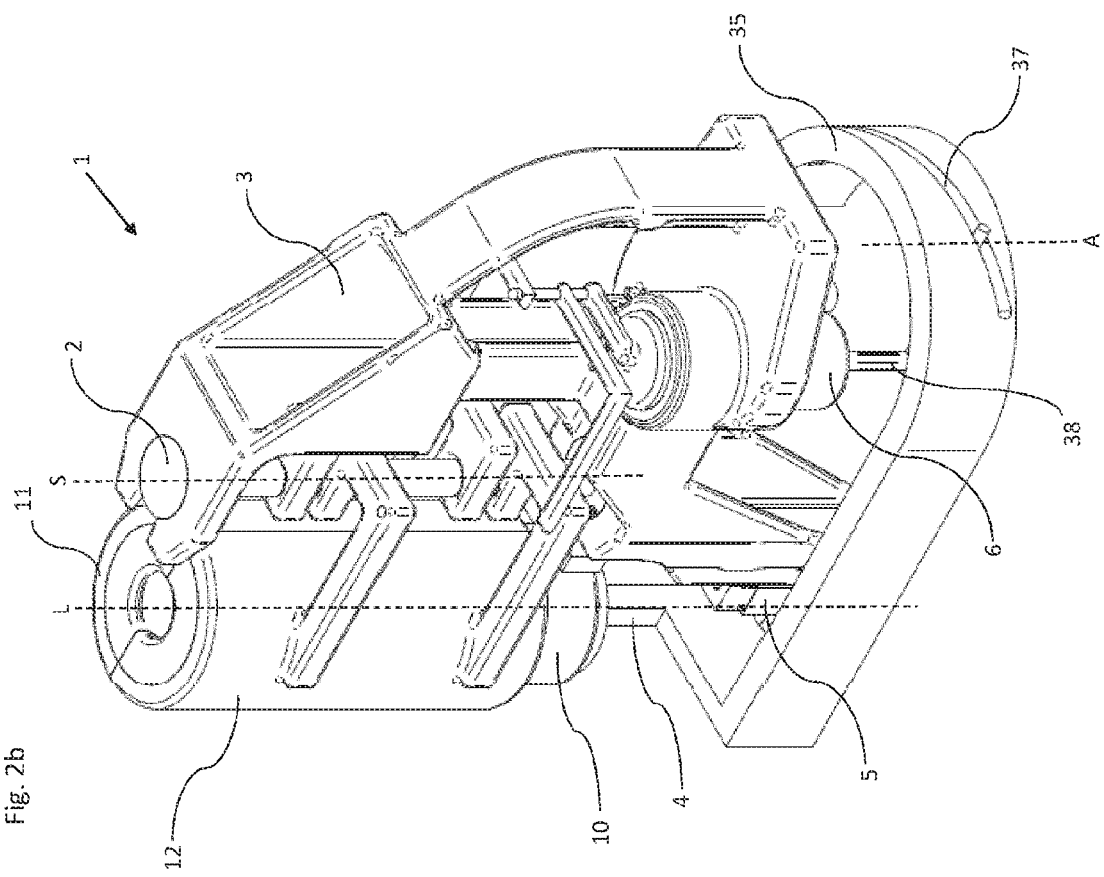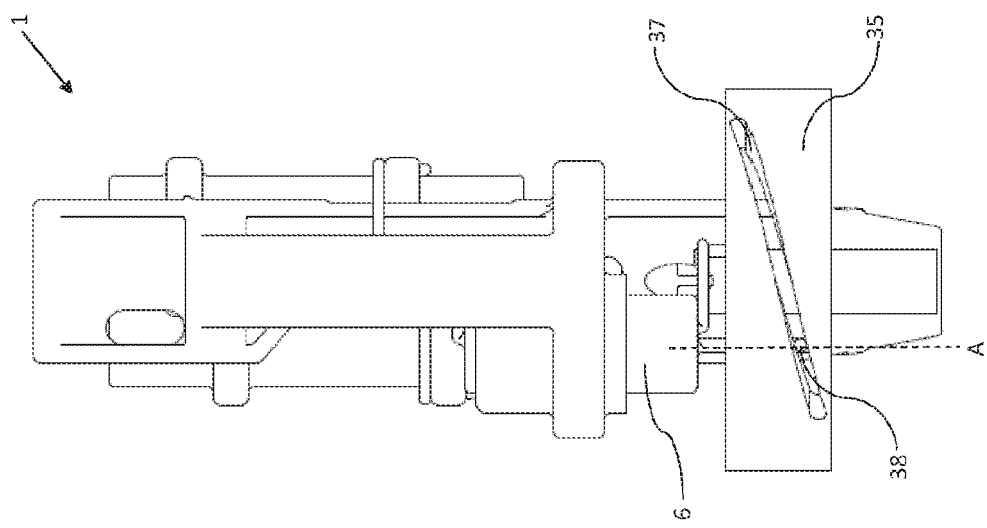

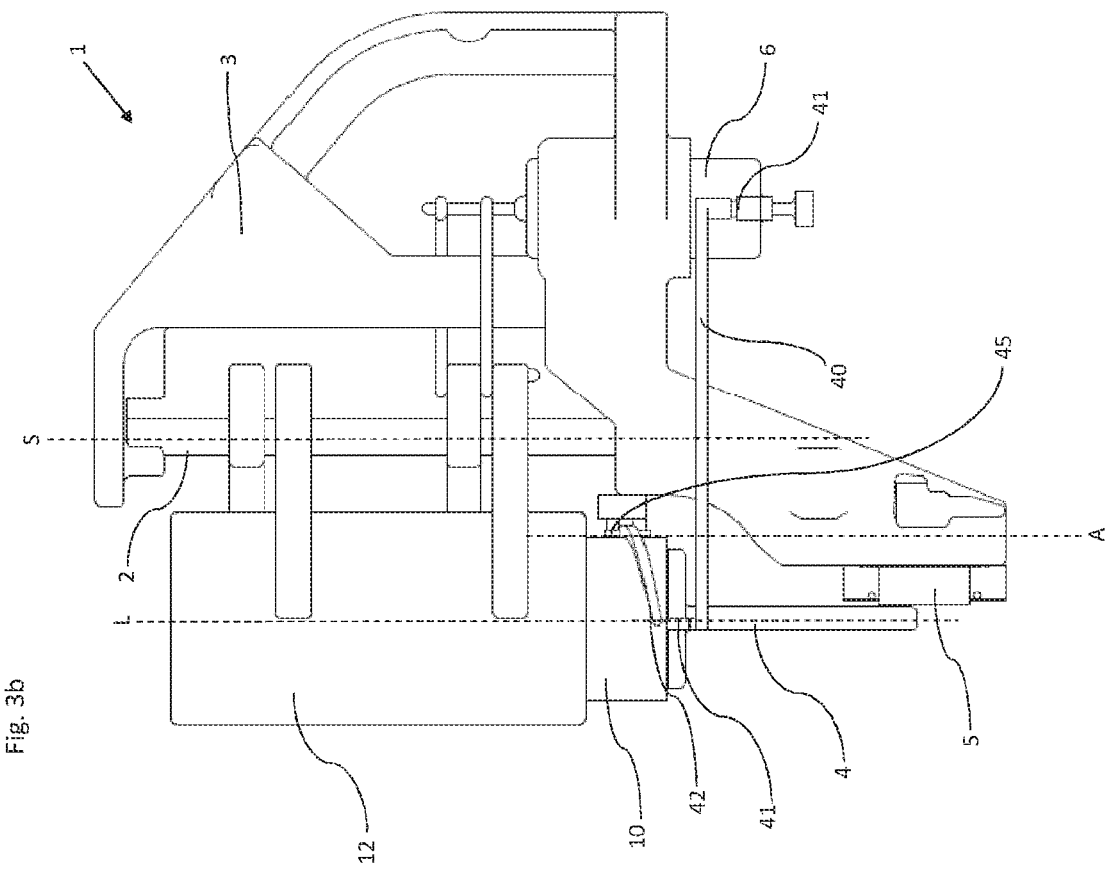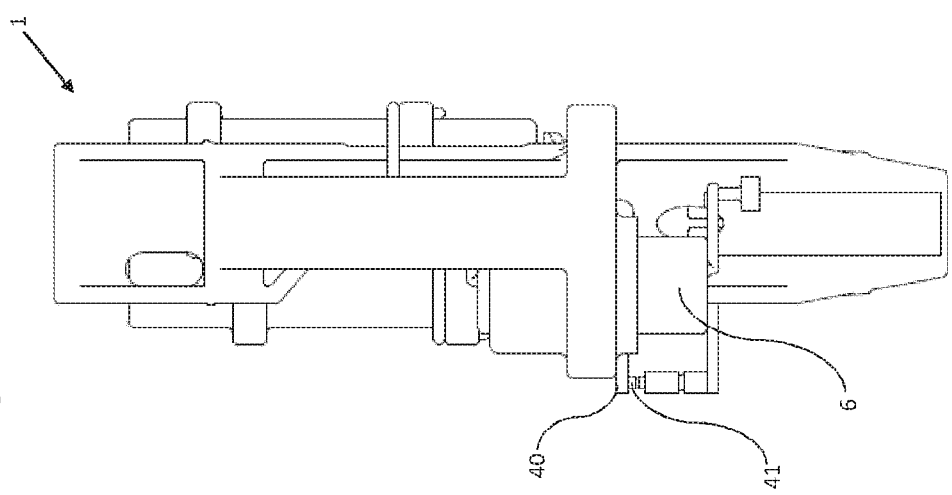

APPARATUS AND METHOD FOR FORMING PLASTIC PREFORMS INTO PLASTIC CONTAINERS WITH COUPLING DEVICE

CROSS-REFERENCE TO RELATED APPLICATIONS

This application claims priority to PCT Application No. PCT/EP2016/071582, having a filing date of Sep. 13, 2016, based on German Application No. 10 2015 117 017.5, having a filing date of Oct. 6, 2015, the entire contents both of which are hereby incorporated by reference.

FIELD OF TECHNOLOGY

The following relates to an apparatus and method for forming plastic preforms into plastic containers. Such apparatus and methods have been known

BACKGROUND

The blow molds are here usually arranged indirectly on a main shaft and have at least one base element and two blow mold (side) parts, wherein the side parts are arranged on mold carriers. The blow mold parts form a cavity, inside which the plastic preforms are formed into plastic containers by stretch blow molding or blow molding. In order to arrange the plastic preforms in the blow mold and be able to remove the fully inflated containers from the blow mold, at least one mold carrier is arranged pivotably on the main shaft and, after opening of the blow mold, the base element can be moved down in the vertical direction.

Therefore usually, an external curve element is provided, which however has the disadvantage that there is an increased risk of faults, since the mold carrier is also closed if the transfer process of the preforms or finished containers is defective. In addition, providing an external curve element requires more space and the blow molding device has a substantially higher overall weight.

SUMMARY

An aspect relates to an apparatus and a method which allow a lift and lower movement of the base holder and at the same time take up as little space as possible. In addition, a weight reduction is to be achieved and the process reliability increased.

An apparatus according to embodiments of the invention for forming plastic preforms into plastic containers has at least one blow molding device, which is arranged at least indirectly on a main shaft that is pivotable about a pivot axis, and which comprises at least two mold carriers, a base element and two blow mold parts, wherein the base element and the blow mold parts are suitable for forming a cavity, inside which the plastic preforms can be formed into the plastic containers, and the base element is arranged on a base holder. The apparatus furthermore has a coupling device which couples an opening movement of the blow mold parts with a lift and lower movement of the base element relative to the blow mold parts (this is generally a rectilinear movement).

According to embodiments of the invention, the coupling device has a—preferably integrated—curve element which cooperates with a further element (which is preferably also a part of the coupling device) such that, by opening of the blow molding device by pivoting of at least one mold carrier about the pivot axis of the main shaft, the curve element and/or the further element can be brought into a rotational movement relative to the pivot axis or an axis parallel to the pivot axis, via which the base holder with the base element can be lowered (or generally, moved in the above-mentioned rectilinear movement with which the base element is moved away from the side parts or brought up to these).

Correspondingly, preferably, the base element is raised by the closure of the mold carrier. Generally, preferably, the base element is moved by the pivoting of the mold carriers in a rectilinear direction, in particular a vertical direction. The rotational movement takes place in particular due to the curve element itself, or due to the further element which is guided inside the curve element. Advantageously, the further element is a roller arrangement with at least one roller which can be guided in the curve element.

It is therefore proposed to provide a coupling device which is directly integrated in the blow molding device, with a curve element for raising and lowering the base element, so that in particular a direct coupling is achieved between the rotational movement of the curve element and/or the further element and the movement of the base element.

In a preferred embodiment, the coupling device is arranged directly on the main shaft. Advantageously, the main shaft and the coupling device are arranged parallel to a vertical longitudinal axis of the blow molding device, and the base element is movable along the vertical longitudinal axis of the blow molding device.

Therefore, instead of the above-mentioned external curve element, for example via a flange connection, a coupling device, which is preferably configured in this embodiment as a cylinder, with an integrated curve element is arranged on the rotatably mounted main shaft. Preferably, the base holder comprises the further element in the form of a roller arrangement which lies on the curve element or which can be guided in the curve element. Opening the mold carriers sets the main shaft and with it preferably also the coupling device with the integrated curve element in a rotational movement, and the base holder with base element is moved downward, preferably along the vertical longitudinal axis of the blow molding device. Consequently, preferably, a defined guide lever is formed by the curve element or by the roller arrangement with at least one roller and an arm.

One advantage of arranging the curve element directly on the main shaft is that, because of the small space required, a substantially compact construction of the blow mold is supported, since no additional components need be arranged on the blow molding device. Therefore, existing blow molding devices can be later equipped with the device according to embodiments of the invention for lowering and raising the base element, without requiring major structural changes to the blow molds. Also, by avoiding an external curve element, process reliability is increased and a substantial weight saving achieved. Because of the omission of the external curve element which is very maintenance-intensive, also the ease of maintenance of the blow molding device is increased.

Preferably, an elastic damping element is arranged on the base element or on the base holder. This elastic damping element, which is preferably formed as an elastic damping spring, here serves to damp the movement of the base element and base holder in the longitudinal direction of the blow molding device. Advantageously, with this damping spring, the movement direction of the base element can be also be limited and in particular an end position of the base element determined, in particular for lowering. In conjunction with the coupling of the individual movements described here, the use of a damping element has proved particularly advantageous since, as a whole, relatively fast opening and closing movements become possible without overloading the mechanisms.

In an advantageous embodiment of the invention, the apparatus has a rotatable carrier, in particular a blow wheel, on which a plurality of the above-mentioned blow molding devices is arranged, wherein this rotatable carrier is arranged inside a clean room. The clean room is advantageously formed as a channel and at least partially surrounds the blow molding devices, so that the blow molding devices are movable inside this clean room. Preferably, the clean room is separated from the environment by several walls. It is also possible that at least one wall is designed movably and rotates with the blow molds, wherein walls which are movable relative to each other are advantageously sealed against each other with a sealing device, in particular a so-called water lock or a hydraulic seal.

In an advantageous embodiment of the coupling device, the curve element integrated in the coupling device is advantageously configured such that it runs as a groove in the circumferential direction of the guide element, so that the at least one roller of the roller arrangement is guided inside this groove. Advantageously, this roller arrangement is here arranged on the base holder. In this way, the movement of the base element and the base holder is generated mechanically by the curve path of the curve element. Advantageously, a separate coupling device with integrated curve element is arranged on each blow mold. Preferably therefore, said curve elements move with the carrier on which the forming stations are arranged. Advantageously, the curve element has a gradient of between 15° and 85°, preferably between 30° and 80°, and particularly preferably between 45° and 75°. Preferably therefore, the curve element is arranged relatively steeply on the coupling device.

Preferably, the curve path of the curve element is formed as a protrusion in the circumferential direction of the guide element, and at least one roller of the roller arrangement runs on the top side of the curve element. In a preferred embodiment, at least one roller runs on the top side of the curve element and at least one further roller on the underside of the curve element, so that the curve element is received between at least two rollers. This guarantees a greater stability and more reliable or smoother guidance of the roller arrangement on the coupling device.

The roller arrangement is advantageously guided relative to the curve element at least as far as a predefined stop which may be arranged on the curve element, or as far as a lower end of the curve element. This stop or lower end corresponds to an end position of the base element.

In a preferred embodiment, a first mold carrier is pivotable in an angle between 20° and 60° relative to the pivot axis defined by the main shaft, and/or a second mold carrier is pivotable in an angle between 1° and 10° relative to the pivot axis defined by the main shaft. Preferably, the pivot angle of the first mold carrier lies between 30° and 55°, preferably between 35° and 45°, and particularly preferably around 44°. The pivot angle of the second mold carrier lies preferably between 2° and 8°, preferably between 3° and 6°, and particularly preferably around 5°. The pivot axis of the main shaft here advantageously runs in the vertical direction, in particular parallel to the longitudinal axis of the blow molding device. It would also be conceivable that a mold carrier is arranged stationary on the main shaft, and only one mold carrier is mounted pivotably on and/or with the main shaft.

Advantageously, the first mold carrier and the second mold carrier consist of different materials, wherein the first mold carrier is preferably made of aluminium and the second mold carrier preferably of special steel. Also, alloys of special steel and aluminium, and all other suitable metals and/or plastics, are conceivable as materials. Advantageously, the mold carrier with the larger pivot angle consists of the lighter material. The advantage of these different materials lies in particular in a weight reduction of the blow molding device and supports the pivoting through different angles. Furthermore, advantageously, only the second mold carrier has a mold carrier shell and a pressure pad. It would also be conceivable however for both mold carriers to have a mold carrier shell and a pressure pad. Normally, the mold carriers then receive the mold carrier shells, and the mold carrier shells in turn receive the blow mold parts.

In a further advantageous embodiment, the base element has a fixing device which fixes the base element relative to the blow mold parts when the blow mold is in a closed state. This fixing of the base element preferably takes place by force fit and/or form fit, in particular in a movement direction of the blow mold parts, with corresponding or complementary configurations of the base element and blow mold parts. Preferably, the blow mold parts or mold carriers are only completely closed and the base element anchored inside the blow mold parts after the base element has reached its definitive end position. The above-mentioned movement of the base element takes place only after the mold carriers have been opened sufficiently far to expose the fixing device of the base element, i.e. the fixing of the base element relative to the blow mold parts has been completely released.

Furthermore, the apparatus has a lock which serves to lock the two blow mold parts together in a closed state of the blow mold. Preferably, this lock is arranged at least partially inside the clean room. Advantageously, furthermore a stretch rod is provided, which can be introduced into the cavity of the blow mold and stretches the preform preferably in the longitudinal direction. Preferably, the forming station as a whole can be removed from the abovementioned carrier.

In a further advantageous embodiment, the base holder comprises a coupling device in the form of a frame with an integrated curve element. This frame advantageously holds the curve element in position with a rotatably mounted opening device, preferably formed as a cylinder. By opening of the mold carriers, the opening device can be set in a rotational movement so that a roller arrangement with at least one roller is guided on the curve element, whereby the base element is lowered along the longitudinal axis of the blow molding device. Advantageously, the movement of the base element takes place after the mold carriers have been opened and the base element released from the fixing. Preferably, the rotational movement of the opening device triggers a rotational movement of the roller arrangement about an axis parallel to the pivot axis.

In a further preferred embodiment, the base holder is mounted rotatably with the base element, and the curve element is directly integrated in the base element, advantageously in a side face of the base element, wherein the base element can be moved via a roller arrangement with at least one roller. Advantageously, the base element is connected to the opening device via a rotatably mounted coupling device in the form of a lever which has at least one movement hinge. Opening the mold carriers sets the opening device in a rotational movement, so that a roller arrangement with at least one roller is guided in the curve element of the base element and hence the base element is lowered along the longitudinal axis of the blow molding device. The base element is raised or lowered only after the mold carriers have been opened and the base element released from the fixing. The rotational movement of the opening device in turn causes a rotation of the roller arrangement about an axis parallel to the pivot axis of the main shaft.

Advantageously, in all embodiments, the movement of the base element along the longitudinal axis of the blow mold is controlled via a linear guide. The linear guide is preferably situated on the base holder and the carrier on which the blow molds are arranged.

The embodiment is here described with reference to blow molding machines in which the base part is always arranged below the side carriers and the containers are inflated with their mouth opening at the top. However, machines are known from the prior art in which the containers are inflated with their mouth opening at the bottom. The embodiments of the invention can be applied accordingly to such machines, wherein here however the base element is raised relative to the side parts to open the blow mold (however, here it is also moved away from the side parts).

The embodiment is furthermore oriented at a method for forming plastic preforms into plastic containers, with a blow molding device which is arranged at least indirectly on a main shaft that is pivotable about a pivot axis, and which comprises at least two mold carriers, a base element and two blow mold parts, wherein the base element and the blow mold parts are suitable for forming a cavity, inside which the plastic preforms can be formed into the plastic containers, and the base element is arranged on a base holder. Furthermore, a coupling device is provided which couples an opening movement of the blow mold parts with a lift and lower movement of the base element.

According to embodiments of the invention, the coupling device has a—preferably integrated—element which cooperates with a further element such that, by opening of the blow molding device by pivoting of at least one mold carrier about the pivot axis of the main shaft, the curve element and/or the further element is brought into a rotational movement relative to the pivot axis or an axis parallel to the pivot axis, via which the base holder with the base element is lowered.

Preferably, on opening the mold carriers, a first mold carrier is pivoted in an angle between 20° and 60° relative to the pivot axis defined by the main shaft, and/or a second mold carrier is pivoted in an angle between 1° and 10° relative to the pivot axis of the main shaft. Preferably, the pivot angle of the first mold carrier is between 30° and 55°, preferably between 35° and 45°, and particularly preferably around 44°. The pivot angle of the second mold carrier is preferably between 2° and 8°, preferably between 3° and 6°, and particularly preferably around 5°.

In an advantageous method, accordingly, closing the mold carriers raises the base element or brings it up to the blow mold side parts. In the fully closed state of the blow molding device, the base element is locked to the blow mold parts. This locking, as already mentioned, takes place preferably by force fit and/or form fit by complementary configurations of the base element and the blow mold parts.

BRIEF DESCRIPTION

Figure 1A:
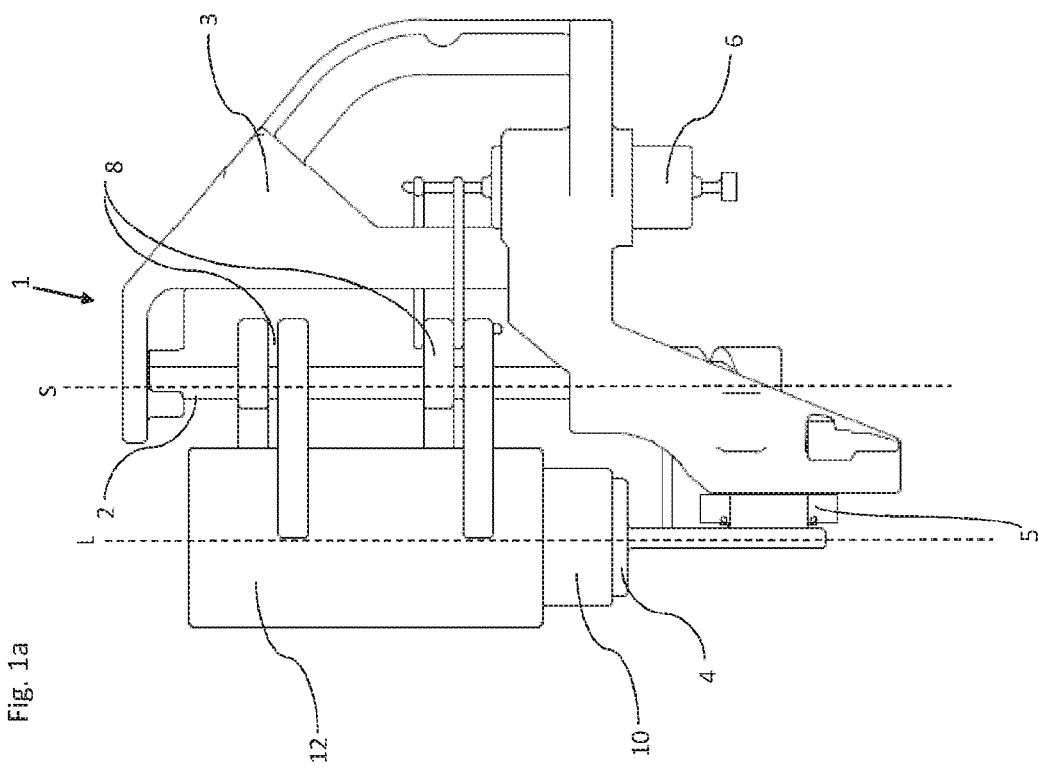
Figure 1C:
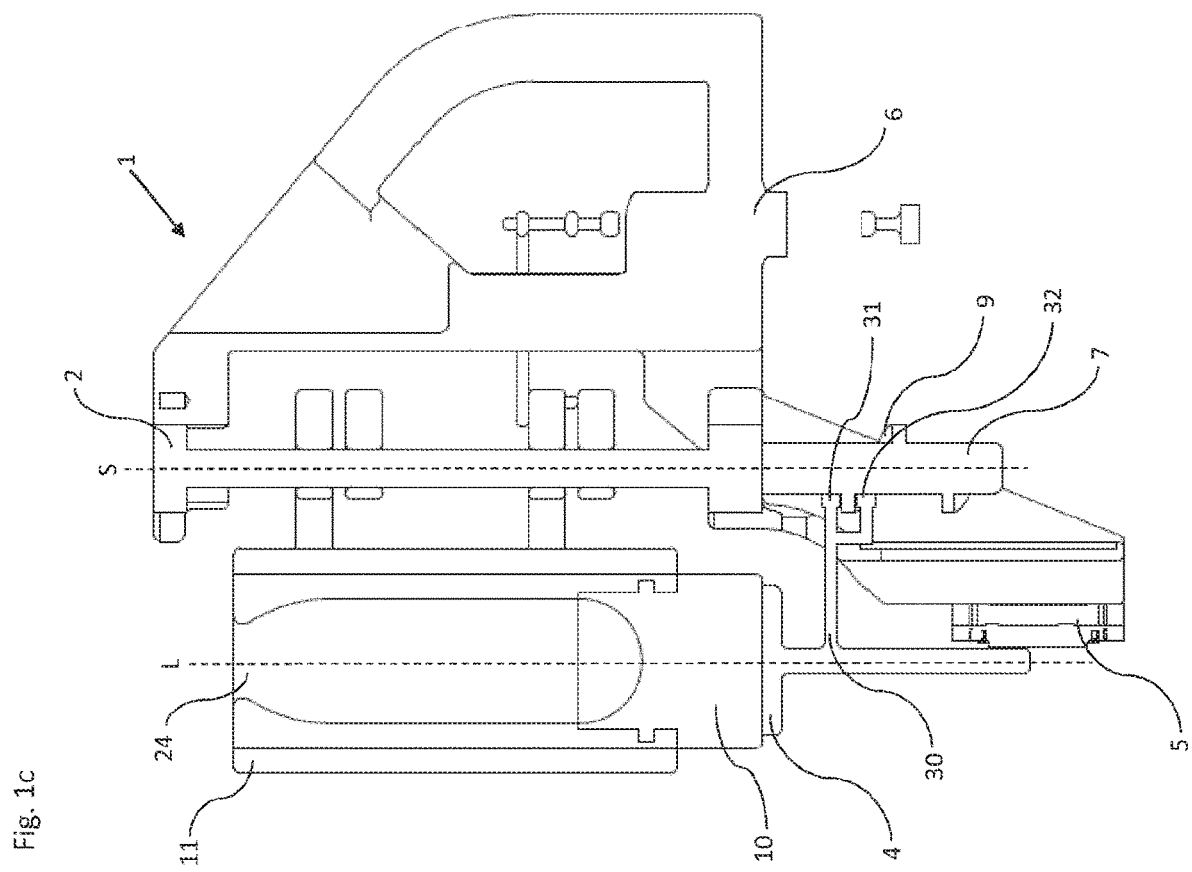
Figure 4B:
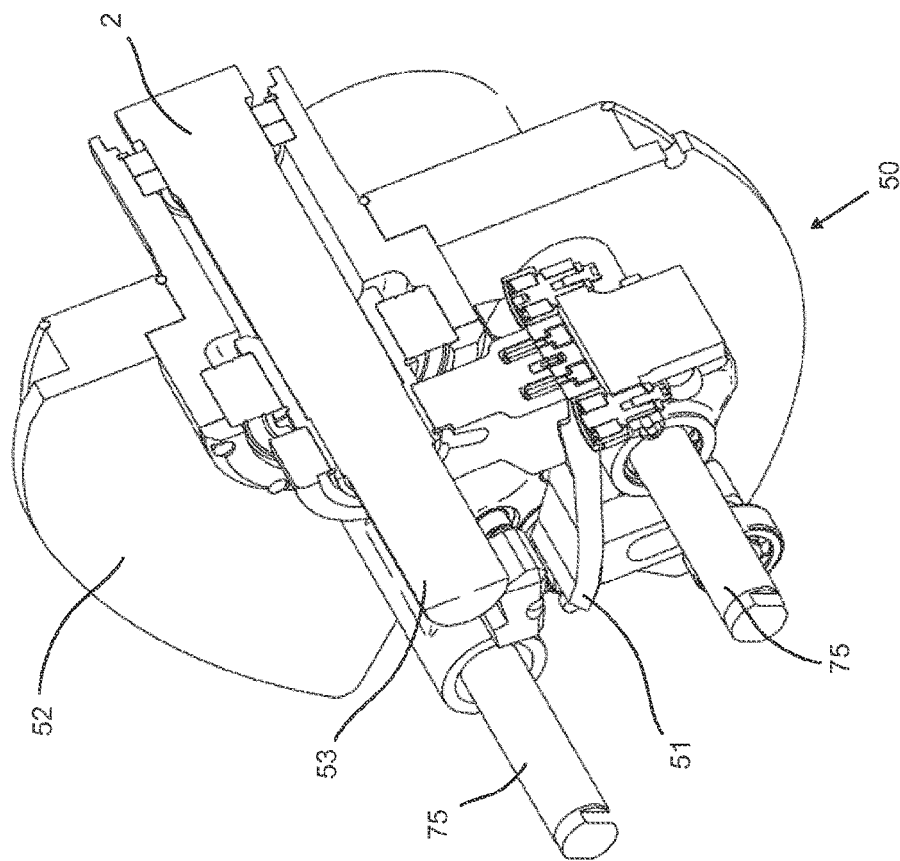
Figure 4A:
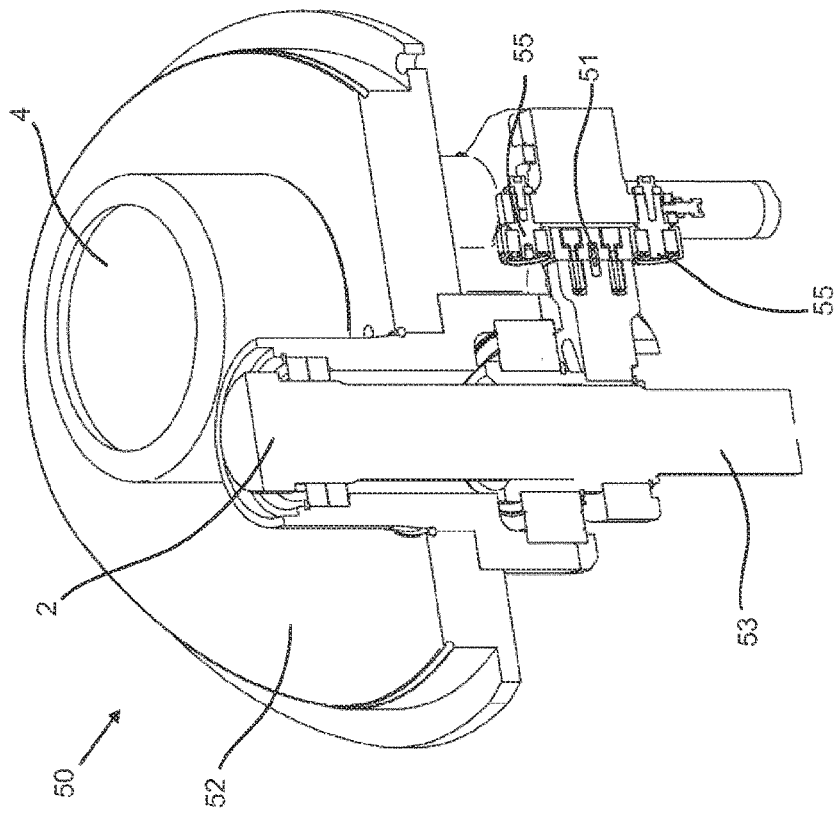
Figure 4D:
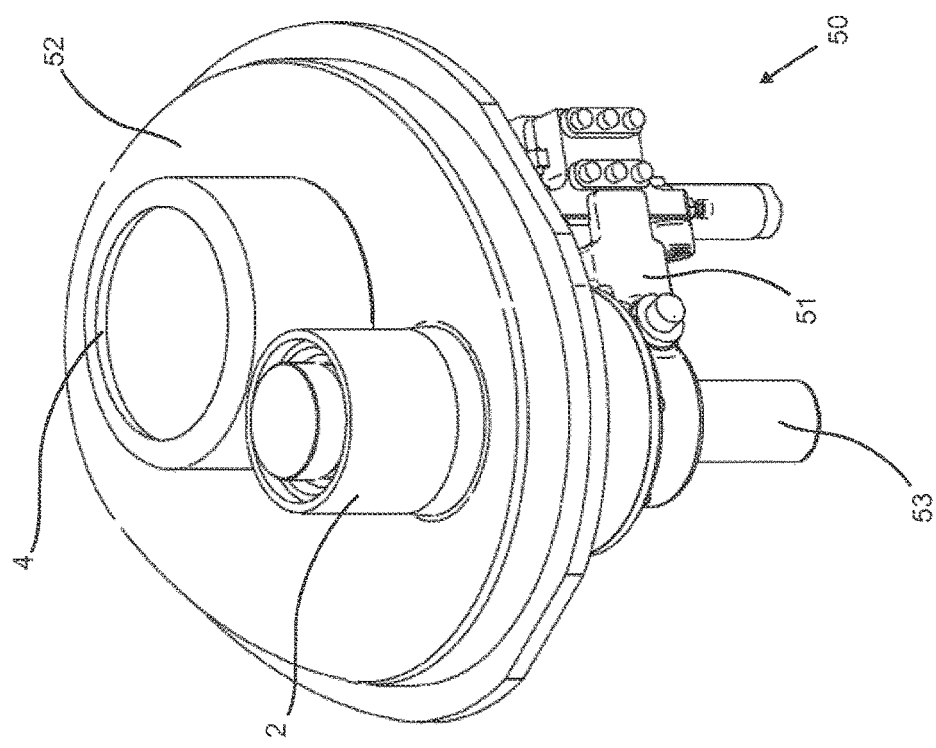
Figure 4C:
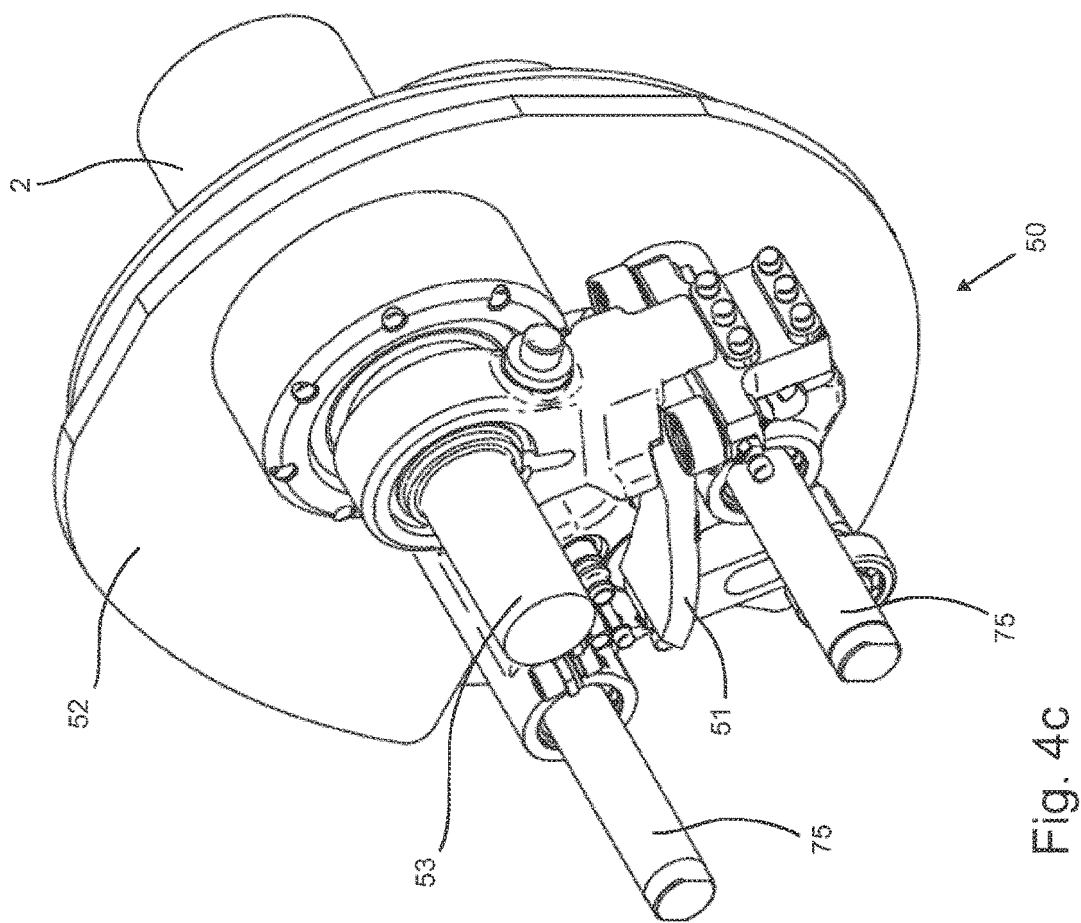
Figure 5A:
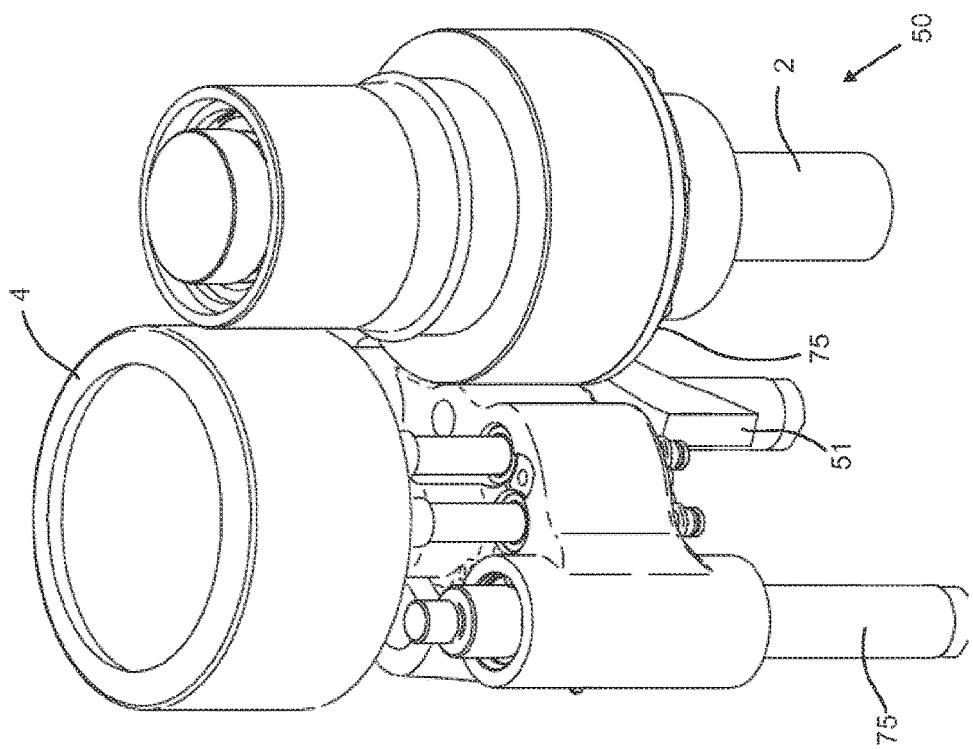
Figure 5B:
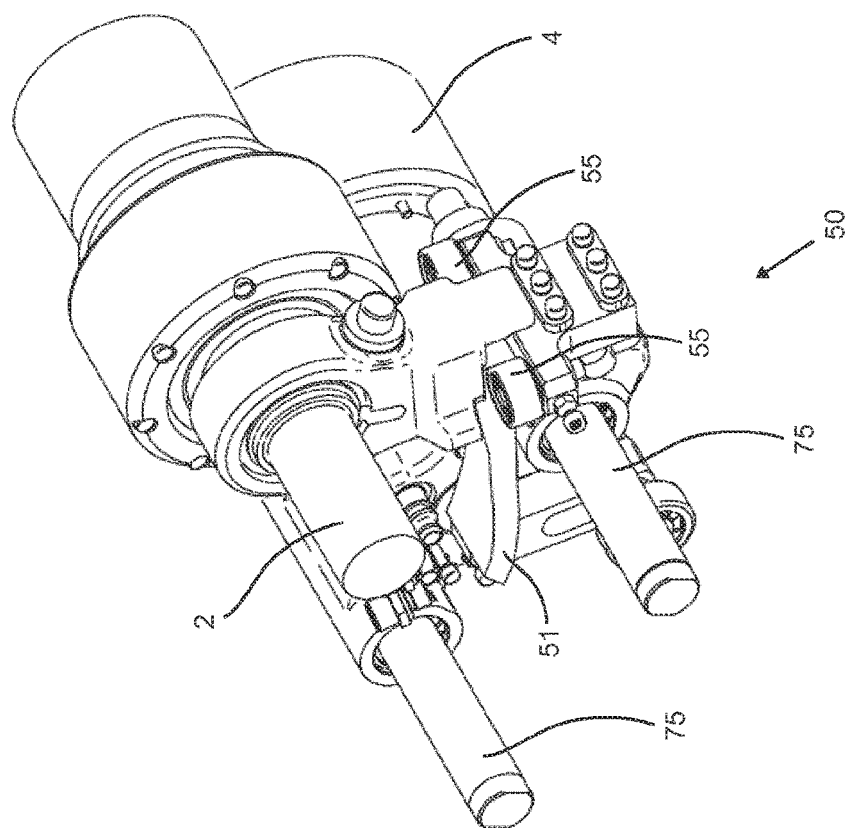
Figure 5D:
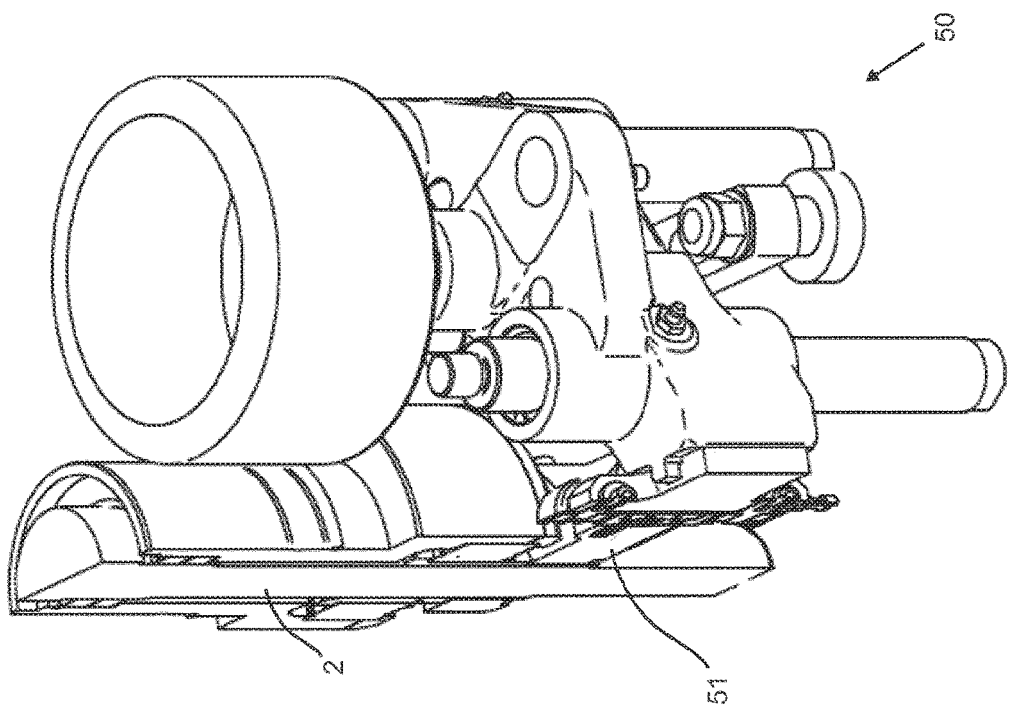
Figure 5C:
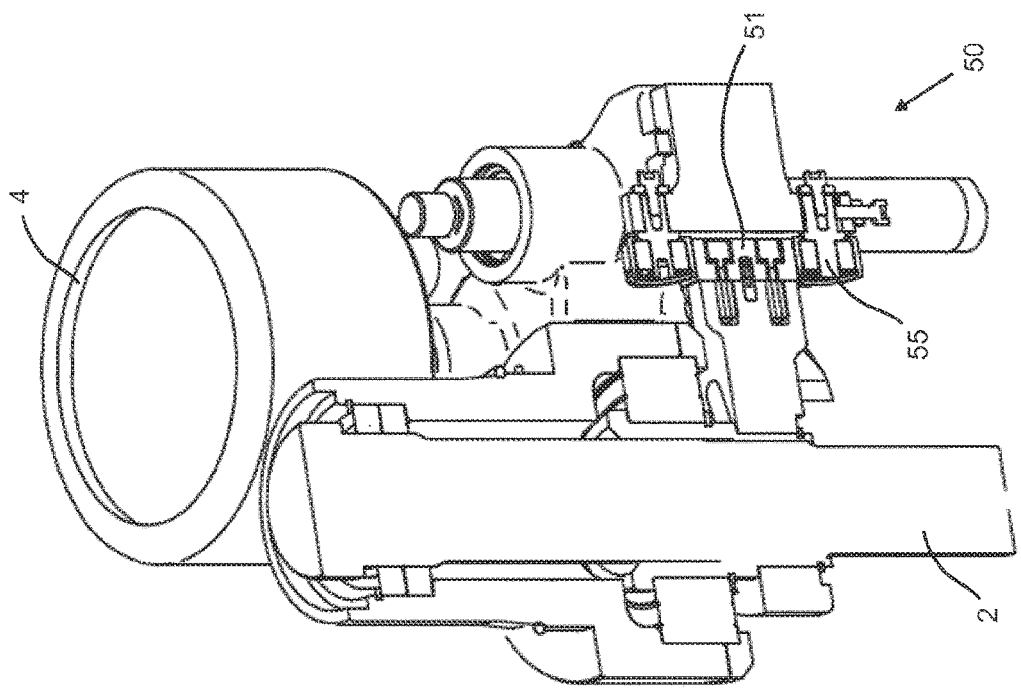
Figure 5E:
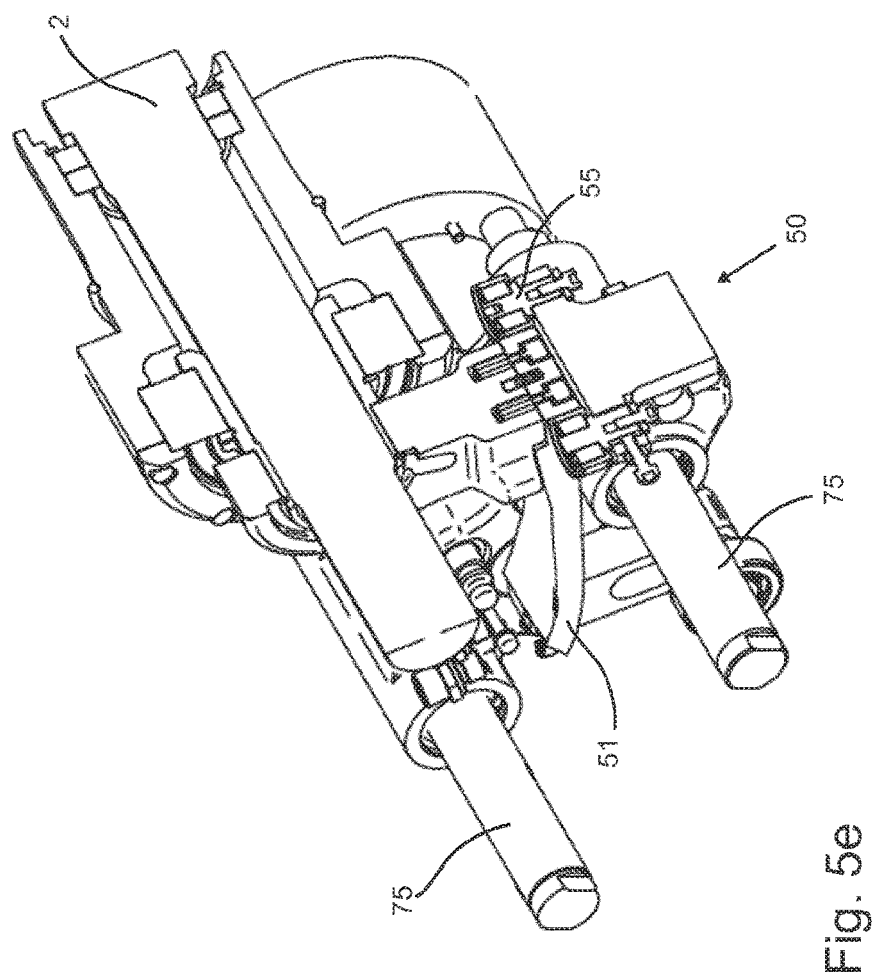

Some of the embodiments will be described in detail, with reference to the following figures, wherein like designations denote like members, wherein:

FIG. 1A depicts a first embodiment;
FIG. 1B depicts a coupling device according to a first embodiment;
FIG. 1C depicts a coupling device according to a further embodiment;
FIG. 2A depicts a further embodiment;
FIG. 2B depicts a perspective view according to the further embodiment of FIG. 2A;
FIG. 3A shows a further embodiment according to embodiments of the invention in a first side view;
FIG. 3B shows a further embodiment according to embodiments of the invention in a second side view;
FIG. 4A depicts a cutaway of base lift unit of the blow molding device in a first view;
FIG. 4B depicts a cutaway of a base lift unit of the blow molding device in a second view;
FIG. 4C depicts a base lift unit of the blow molding device in a second view;
FIG. 4D depicts a base lift unit of the blow molding device in a first view;
FIG. 5A depicts the base lift unit of the blow molding device according to FIGS. 4A-4D;
FIG. 5B depicts a second view of the base lift unit of the blow molding device according to FIGS. 4A-4D;
FIG. 5C depicts a third view of the base lift unit of the blow molding device according to FIGS. 4A-4D;
FIG. 5D depicts a cutaway of fourth view of the base lift unit of the blow molding device according to FIGS. 4A-4D; and
FIG. 5E depicts a cutaway of a fifth view of the base lift unit of the blow molding device according to FIGS. 4A-4D.

DETAILED DESCRIPTION

FIGS. 1A-1C show three depictions of a first embodiment according to embodiments of the invention. The blow molding device 1 is arranged or hinged on a main shaft 2 via a plurality of connecting rods 8, and here comprises a base element 10 arranged on a base holder 4, two blow mold parts 21, 22 forming a cavity 24, and two mold carriers 11, 12. At least one mold carrier 11, 12 is mounted pivotably relative to a pivot axis S of the main shaft 2. The pivot axis S is oriented parallel to a longitudinal axis L of the blow mold. In particular, FIG. 1a shows an opening device 6 which is connected to the mold carriers 11, 12 via a plurality of connecting rods 8. When the blow mold is opened, at least one mold carrier 11, 12 is pivoted about the pivot axis S, and the opening device 6 and the main shaft 2 with a coupling device 7 arranged on the main shaft are set in a rotational movement, whereby a roller arrangement 30 of the base holder 4 is guided on the coupling device 7 so that the base element 10 is lowered.

Reference sign 5 designates a linear guide arranged on the base holder 4 and a carrier 3. This linear guide 5 supports the movement of the base element 10 in the longitudinal direction L of the blow mold.

FIGS. 1A and 1B show a first embodiment of the coupling device, wherein the coupling device 7 here has an integrated curve element 25 arranged as a groove 25 in the circumferential direction of the coupling device 7. When the base element is lowered or raised, as shown in FIG. 1B, at least one roller 33 of the roller arrangement 30 of the base holder 4 is guided in this groove 25. The groove is preferably slightly wider than the diameter of the roller which runs in this groove.

FIG. 1C shows a coupling device according to a further embodiment. Here, an integrated curve element 9 is formed on the coupling device 7 and arranged as a protrusion in the circumferential direction of the coupling device 7. It is evident that the base holder 4 comprises the roller arrangement 30 with an upper roller 31 and a lower roller 32 which receive the curve element 9 between them, while the roller arrangement 30 is guided on this curve element 9.

FIG. 1B also shows a fixing device 46 arranged on the base element 10, and a corresponding fixing device 47 of the blow mold parts 21, 22, which engage with each other in a closed state of the blow molding device and fix the base element 10 relative to the blow mold.

FIGS. 2A and 2B show a further embodiment according to embodiments of the invention. A coupling device 35 in the form of a frame 35 is arranged on the base holder 4, and a curve element 37 integrated therein. In this embodiment, it is evident from FIG. 2B in particular that here a roller arrangement 38 is arranged on the opening device 6 and guided in the curve element 37. It is also clear from FIG. 2B that the frame 35 is not fully closed, whereby it is however also possible to close this completely. By opening the blow mold, again the opening device 6 is here set in a rotational movement, whereby the roller arrangement 38 is moved in the curve element 37 and the base element 10 is lowered. Also, in particular, FIG. 2B again shows the linear guide 5.

Reference sign A here designates a further axis which runs parallel to the pivot axis S. Opening the mold carriers sets the roller arrangement 38 in a rotational movement about axis A.

FIGS. 3A-3B show a further embodiment according to embodiments of the invention. The base holder 4 is here mounted rotatably with the base element 10, and connected to the opening device 6 via a coupling device 40 in the form of a lever 40 with at least one and preferably two movement hinges 41. In this embodiment, a curve element 42 is integrated directly in the base element 10. The rotational movement of the opening device 6 here sets the base holder 4, and accordingly the base element 10, in a rotational movement via the lever 40, so that a roller arrangement 45 with at least two rollers receives the curve element 42 of the base element 10 between these and the base element 10 is lowered. It is however also conceivable that the curve element 42 is here again formed as a groove, so that at least one roller of the roller arrangement 45 is guided inside this groove. Reference sign 5 in FIG. 3B here again designates the linear guide of the base element. Axis A again designates an axis parallel to the pivot axis S about which the roller arrangement 45 can be rotated when the mold carriers are opened.

FIGS. 4A-4D show four depictions of a base lift unit 50 of the blow molding device in various views. Reference sign 75 here designates an opening and movement device for opening the blow mold and for the lift and lower movement of the base element, again showing that these movements are coupled together. Reference sign 51 designates a curve segment which supports the lift and lower movement of the base element, in that at least one guide roller 55 and preferably two guide rollers 55 are guided on the curve segment. In particular, it is evident from FIG. 4A that both the main shaft 2 and the base holder 4 are arranged on a common receiver 52. This receiver 52 serves in particular to arrange the blow molding device inside a clean room and separate this clean room from the environment. Reference sign 53 designates a lower region of the main shaft which is arranged outside the clean room. FIGS. 5A-5E show further depictions of the base lift unit 50 according to FIGS. 4A-4D. For reasons of clarity however, the receiver has not been shown here.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCE SIGNS

1 Blow molding device
2 Main shaft
3 Carrier
4 Base holder
5 Linear guide
6 Opening device
7 Coupling device
8 Connecting rods
9 Curve element
10 Base element
11 First mold carrier
12 Second mold carrier
21 Blow mold part
22 Blow mold part
24 Cavity
25 Curve element, groove
30 Roller arrangement, further element for base holder
31 Upper roller
32 Lower roller
33 Roller
35 Coupling device, frame
37 Curve element
38 Roller arrangement, further element
40 Coupling device, lever with movement hinge
41 Movement hinge
42 Curve element
45 Roller arrangement, further element
46 Fixing device for base element
47 Fixing device for blow mold parts
50 Base lift unit
51 Curve segment
52 Receiver
53 Lower region of main shaft
55 Guide roller
75 Opening and movement device
L Longitudinal axis of blow mold
S Pivot axis of main shaft 2
A Axis The claims are as followed:

1. An apparatus for forming plastic preforms into plastic containers with a blow molding device, which is arranged at least indirectly on a main shaft that is pivotable about a pivot axis, and which comprises at least two mold carriers, a base element and two blow mold parts, wherein the base element and the blow mold parts are suitable for forming a cavity inside which the plastic preforms can be formed into the plastic containers, and the base element is arranged on a base holder, and with a coupling device which couples an opening movement of the blow mold parts to a lift and lower movement of the base element relative to the blow mold parts, wherein the coupling device has a curve element which cooperates with a further element such that, by opening of the blow molding device by pivoting of at least one mold carrier about the pivot axis of the main shaft, at least one of the curve element and the further element can be brought into a rotational movement relative to the pivot axis, via which the base holder with the base element can be lowered, wherein the coupling device is arranged directly on the main shaft and wherein a curve path of the curve element is formed as a protrusion in a circumferential direction of the guide element, and at least one roller runs on the top side of the curve element and at least one further roller runs on the underside of the curve element, such that the curve element is received between at least the one roller and the one further roller.

2. The apparatus according to claim 1,
wherein
the further element is a roller arrangement with at least one roller which can be guided in the curve element.

3. The apparatus according to claim 1,
wherein
an elastic damping element is arranged on the base element or on the base holder.

4. The apparatus according to claim 1,
wherein
the apparatus has a rotatable carrier on which a plurality of these blow molding devices is arranged.

5. The apparatus according to claim 4,
wherein
the rotatable carrier is arranged inside a clean room.

6. The apparatus according to claim 1,
wherein
a first mold carrier is pivotable in an angle between 20° and 60° relative to the pivot axis defined by the main shaft, and/or a second mold carrier is pivotable in an angle between 1° and 10° relative to the pivot axis defined by the main shaft.

7. The apparatus according to claim 1,
wherein
the first mold carrier and the second mold carrier consist of different materials.

8. The apparatus according to claim 1,
wherein
the base element has a fixing device which fixes the base element relative to the blow mold parts when the blow mold is in a closed state.

9. A method for forming plastic preforms into plastic containers, with a blow molding device which is arranged at least indirectly on a main shaft that is pivotable about a pivot axis, and which comprises at least two mold carriers, a base element and two blow mold parts, wherein the base element and the blow mold parts are suitable for forming a cavity, inside which the plastic preforms can be formed into the plastic containers, and the base element is arranged on a base holder, and with a coupling device which couples an opening movement of the blow mold parts with a lift and lower movement of the base element relative to the blow mold parts,
wherein
the coupling device has a curve element which cooperates with a further element such that, by opening of the blow molding device by pivoting of at least one mold carrier about the pivot axis of the main shaft, at least one of the curve element and the further element is brought into a rotational movement relative to the pivot axis, via which the base holder with the base element is lowered, wherein the coupling device is arranged directly on the main shaft and wherein a curve path of the curve element is formed as a protrusion in a circumferential direction of the guide element, and at least one roller runs on the top side of the curve element and at least one further roller runs on the underside of the curve element, such that the curve element is received between at least the one roller and the one further roller.

10. The method according to claim 9,
wherein
on opening the mold carriers, a first mold carrier is pivoted in an angle between 20° and 60° relative to the pivot axis defined by the main shaft, and/or a second mold carrier is pivoted in an angle between 1° and 10° relative to the pivot axis of the main shaft.

11. The apparatus according to claim 1,
wherein
the main shaft and the coupling device are arranged parallel to a vertical longitudinal axis of the blow molding device.

12. The apparatus according to claim 1,
wherein
the main shaft and the base holder are arranged on a common receiver.

13. The apparatus according to claim 1,
wherein
the curve element integrated in the coupling device is configured such that it runs as a groove in a circumferential direction of the guide element.

14. The apparatus according to claim 1,
wherein
the base holder is mounted rotatably with the base element and the curve element is directly integrated in a side face of the base element.

15. The apparatus according to claim 1,
wherein
the apparatus comprises an opening device which is connected to the mold carriers via a plurality of connecting rods.

* * * * *